J. W. Moon,
Water Wheel.
No. 608.  Patented Feb. 15, 1838.
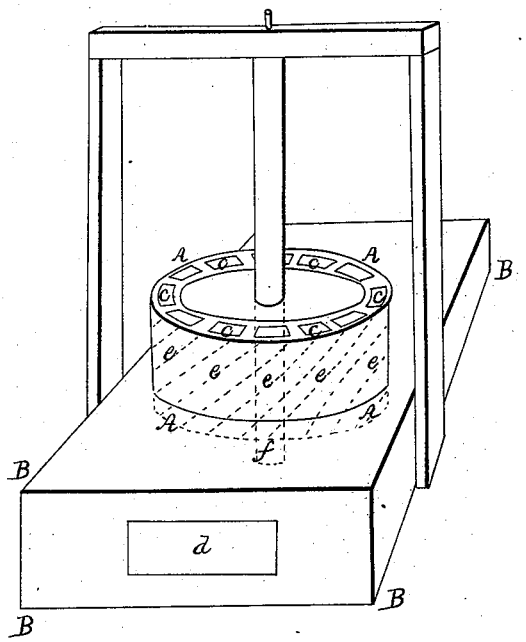
Witnesses.
Alexander Daniell
John L. More
Inventor:
John W. Moon

UNITED STATES PATENT OFFICE.

JOHN W. MOON, OF ROXBURY, NEW YORK.

IMPROVEMENT IN WATER-WHEELS.

Specification forming part of Letters Patent No. 608, dated February 15, 1838.

*To all whom it may concern:*

Be it known that I, JOHN W. MOON, of Roxbury, in the county of Delaware and State of New York, have invented a new and Improved Water-Wheel for Propelling Grist-Mills, Saw-Mills, or any other Machinery Usually Driven by Water-Power; and I do hereby declare that the following is a full and exact description thereof.

The wheel is in the form of a cylinder, of any required size or proportions, and made of cast-iron, wood, or other materials. Near its outer circumference there are several apertures or passages passing spirally from one end of the cylinder to the other and being open at both ends and equidistant from the axis of the wheel. Each of these spiral passages may in its whole length pass quite round the axis of the wheel or form a shorter curve, as may be best calculated for obtaining the full force of the current of water passing through it.

One end of the water wheel or cylinder is inserted into a corresponding circular opening in the box or reservoir for the water, as represented in the annexed drawing, so that the water on being pressed into the reservoir cannot escape in any other way except by passing through the spiral apertures in the wheel before described. The wheel is let down into this box or reservoir so far that its lower surface shall be flush, or nearly so, with the inner surface of the upper part of the reservoir. By the action of the water in pressing against the inner surface of the spiral passages the wheel receives its motion. The main shaft, passing through the wheel, rests at one end in a step in the bottom of the reservoir, while the other end is connected with frame-work outside of the reservoir, as represented in the annexed drawing. The advantages which it is supposed to possess over other wheels is that the water has a freer egress from the wheel by passing upward, the air, which is mixed with the water, rising naturally in that direction, and in its being also adapted to run under water with very little resistance from the surrounding fluid.

What I claim as my invention, and desire to secure by Letters Patent. is—

The construction and use of a wheel such as I have described, having spiral apertures, into which the water is admitted from a reservoir below and discharged at the upper side of the wheel, the whole constructed, combined, and operating substantially in the manner herein set forth.

Dated Roxbury August 4, 1837.

JOHN W. MOON.

Witnesses:
ALEXANDER DANIEL,
D. L. WICKER.